(12) United States Patent
Takase et al.

(10) Patent No.: US 12,703,248 B2
(45) Date of Patent: Aug. 11, 2026

(54) ELECTRIC WORK VEHICLE

(71) Applicant: KUBOTA CORPORATION, Osaka (JP)

(72) Inventors: Shunya Takase, Sakai (JP); Yukifumi Yamanaka, Sakai (JP); Kazuto Okazaki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 40 days.

(21) Appl. No.: 18/679,592

(22) Filed: May 31, 2024

(65) Prior Publication Data

US 2024/0308351 A1 Sep. 19, 2024

Related U.S. Application Data

(63) Continuation of application No. PCT/JP2022/041913, filed on Nov. 10, 2022.

(30) Foreign Application Priority Data

Dec. 27, 2021 (JP) ................................ 2021-213172

(51) Int. Cl.
*B60L 3/04* (2006.01)
*B60L 50/51* (2019.01)

(52) U.S. Cl.
CPC ................ *B60L 3/04* (2013.01); *B60L 50/51* (2019.02); *B60L 2200/40* (2013.01);
(Continued)

(58) Field of Classification Search
CPC ........ B60L 3/04; B60L 50/51; B60L 2200/40; B60L 2210/40; B60L 2240/421;
(Continued)

(56) References Cited

U.S. PATENT DOCUMENTS

2003/0085680 A1 5/2003 Wakitani et al.
2004/0145338 A1* 7/2004 Nakamura ............... B60L 3/12
318/434

(Continued)

FOREIGN PATENT DOCUMENTS

JP 10-248104 A 9/1998
JP 2003-143704 A 5/2003

(Continued)

OTHER PUBLICATIONS

Official Communication issued in International Patent Application No. PCT/JP2022/041913, mailed on Jan. 31, 2023.

(Continued)

*Primary Examiner* — Rodney A Butler
(74) *Attorney, Agent, or Firm* — Keating & Bennett, LLP

(57) ABSTRACT

An electric work vehicle includes a battery in a machine body, an inverter to convert DC power output from the battery to AC power, a motor drivable by the AC power converted by the inverter, a rotational speed detector to obtain rotational speed information indicative of a rotational speed of the motor, a travel device drivable by the motor, an operator to change a required rotational speed required for the motor, and a controller configured or programmed to control a current flowing through the motor by operating the inverter in accordance with the rotational speed information and the required rotational speed. When a load applied to the motor is higher than a load set in advance, the controller is configured or programmed to stop driving the motor irrespective of the required rotational speed.

9 Claims, 7 Drawing Sheets

(52) U.S. Cl.
CPC ..... *B60L 2210/40* (2013.01); *B60L 2240/421* (2013.01); *B60L 2240/429* (2013.01); *B60L 2240/80* (2013.01)

(58) Field of Classification Search
CPC ........... B60L 2240/429; B60L 2240/80; B60L 1/003; B60L 2240/12; B60L 2240/423; B60L 2250/26; B60L 3/00; B60L 15/20; B60L 50/60; B60K 1/04; Y02T 10/72
See application file for complete search history.

(56) References Cited

U.S. PATENT DOCUMENTS

| | | | |
|---|---|---|---|
| 2014/0062352 | A1 | 3/2014 | Wang et al. |
| 2016/0020714 | A1 | 1/2016 | Wang et al. |
| 2018/0215404 | A1 * | 8/2018 | Hayashi .................. B62B 5/004 |
| 2022/0379970 | A1 | 12/2022 | Nakayama |

FOREIGN PATENT DOCUMENTS

| | | | |
|---|---|---|---|
| JP | 2010252526 | A | 11/2010 |
| JP | 2011-046300 | A | 3/2011 |
| JP | 2012-011936 | A | 1/2012 |
| JP | 2014-117026 | A | 6/2014 |
| JP | 2021-000957 | A | 1/2021 |

OTHER PUBLICATIONS

Official Communication issued in corresponding European Patent Application No. 22915554.4, mailed on Nov. 17, 2025, 12 pages.

* cited by examiner 30
31
3
32
16
11
15
19
M
Q
4
12
10
2
B
U
D
F

A1(A)
A2(A)
L1
A3(A)
14
Q1
D1
n1
n2
n3
Q2
D2
4
L2
M
42
TRAVEL DEVICE
HYDRAULIC CONTINUOUSLY VARIABLE TRANSMISSION
TRANSMISSION
FRONT WHEEL
REAR WHEEL
10
11
15
16
41A
51
CURRENT SENSOR
44
CONTROLLER
TORQUE CALCULATOR
52
43
43A
ROTATIONAL SPEED DETECTOR
41
58
POSITION DETECTOR
NOTIFIER
57
59
55
CANCEL INSTRUCTION INFORMATION RECEIVER
START BUTTON
61

REQUIRED ROTATIONAL SPEED [rpm]
N2
N1
0
10
20
40
60
80
90
100
OPERATION AMOUNT[%]
OPERATION AMOUNT : 0%
OPERATION AMOUNT : 100%
43

THE MOTOR IS STOPPED.
CANCEL THE RESTRICTION.

THE MOTOR IS STOPPED.
CANCEL THE RESTRICTION.

59

ELECTRIC WORK VEHICLE

CROSS REFERENCE TO RELATED APPLICATIONS

This application claims the benefit of priority to Japanese Patent Application No. 2021-213172 filed on Dec. 27, 2021 and is a Continuation application of PCT Application No. PCT/JP2022/041913 filed on Nov. 10, 2022. The entire contents of each application are hereby incorporated herein by reference.

BACKGROUND OF THE INVENTION

1. Field of the Invention

The present invention relates to electric work vehicles each capable of traveling by using electric energy.

2. Description of the Related Art

Electric work vehicles that travel by using electric energy as a motive power source have been conventionally used. An example of such an electric work vehicle is described in JP 2021-957A.

JP 2021-957A describes an electric work vehicle that includes a battery, a motor driven by power supplied from the battery, and a travel device driven by the motor.

SUMMARY OF THE INVENTION

Other than the electric work vehicles described above, there are work vehicles that use an engine as a motive power source. A motor that is used as a motive power source of an electric work vehicle is configured to be capable of outputting a high torque at a lower rotational speed when compared with an engine. On the other hand, an engine may stop (so-called "engine stall") if a high torque is to be obtained when the rotational speed is low, for example. Even in such a state where the engine stall occurs due to the low rotational speed and the high torque, the motor does not stop and keeps working and therefore, for example, a user who has switched from a work vehicle that uses an engine as a motive power source to an electric work vehicle may feel like something is wrong. Moreover, since the motor does not stop even in the state where the rotational speed is low and the torque is high, a burden may be imposed on the motor due to a high load being continuously applied to the motor.

Therefore, there is demand for an electric work vehicle whose behavior when the rotational speed is low and the torque is high is similar to the behavior of a work vehicle that uses an engine as a motive power source.

An electric work vehicle according to an example embodiment of the present invention includes a battery in a machine body, an inverter to convert DC power that is output from the battery to AC power, a motor drivable by the AC power converted by the inverter, a rotational speed detector to obtain rotational speed information indicative of a rotational speed of the motor, a travel device drivable by the motor, an operator to change a required rotational speed required for the motor, and a controller configured or programmed to control a current flowing through the motor by operating the inverter in accordance with the rotational speed information and the required rotational speed, wherein when a load applied to the motor is higher than a load set in advance, the controller is configured or programmed to stop driving the motor irrespective of the required rotational speed.

Most motors are capable of outputting a higher torque than an engine when rotating at a low speed. With this characteristic configuration, it is possible to stop the motor when the load applied to the motor is higher than the load set in advance. Therefore, the motor is able to behave similarly to an engine that stops when an excessively high load is applied thereto while rotating at a low speed. Accordingly, even if a driver has switched from a work vehicle that uses an engine as a motive power source to the electric work vehicle that uses the motor as a motive power source, for example, the driver can drive the electric work vehicle without feeling that something is wrong.

It is preferable that an electric work vehicle according to an example embodiment of the present invention further includes a current sensor to detect a current value of the current flowing through the motor, and a torque calculator to calculate a torque that is output from the motor based on the current value, and when the torque output from the motor is larger than a torque value set in advance, the controller is configured or programmed to stop driving the motor.

With this configuration, it is possible to easily calculate the torque output from the motor. Accordingly, the controller is capable of determining easily whether or not the load is high based on the calculated torque, and appropriately determining whether or not the load applied to the motor is higher than the load set in advance. Also, it is possible to prevent an excessively high load from acting on the motor, and therefore, it is possible to reduce or prevent deterioration of the motor.

Also, it is preferable that, when the rotational speed of the motor is not higher than a rotational speed set in advance, the controller is configured or programmed to stop driving the motor irrespective of the required rotational speed.

With this configuration, it is possible to simulate a so-called "engine stall" if the rotational speed of the motor is not higher than the rotational speed set in advance when the electric work vehicle starts to travel, for example. Therefore, the driver can drive the electric work vehicle similarly to a work vehicle that uses an engine as a motive power source.

It is preferable that, when for a predetermined period of time, the rotational speed of the motor has been not higher than the rotational speed set in advance, the controller is configured or programmed to stop driving the motor.

According to this configuration, driving of the motor is not stopped when the rotational speed of the motor temporarily becomes equal to or lower than the rotational speed set in advance, and therefore, the electric work vehicle is continuously drivable.

It is preferable that, when the rotational speed of the motor has become equal to or lower than an idling rotational speed that is lower than the required rotational speed due to an increase in the load applied to the motor, the controller is configured or programmed to stop driving the motor.

With this configuration, it is possible to make the behavior of the electric work vehicle closer to the behavior of a work vehicle that uses an engine as a motive power source.

It is preferable that, when the load applied to the motor has become higher than the load set in advance due to the travel device, the controller is configured or programmed to reduce a hydraulic pressure of a hydraulic continuously variable transmission included in the travel device by driving a relief valve, and when a high load is still applied to the motor after the relief valve is driven, the controller is configured or programmed to stop driving the motor.

According to this configuration, when the load applied to the travel device increases due to the electric work vehicle being stuck in mud, for example, the hydraulic pressure of the hydraulic continuously variable transmission in the travel device is released, and if the load applied to the motor is consequently reduced, driving of the motor is not stopped, and therefore, the electric work vehicle is capable of continuing to travel. On the other hand, if the state were the high load is applied to the motor continues after the hydraulic pressure of the hydraulic continuously variable transmission in the travel device is released, driving of the motor is stopped to make the behavior of the electric work vehicle closer to the behavior of a work vehicle that uses an engine as a motive power source.

It is preferable that, when driving of the motor is stopped irrespective of the required rotational speed, the controller is configured or programmed to enter a restricted state where operating of the inverter is restricted, and the restricted state is canceled in response to cancel instruction information being input from a driver.

In order to restart an engine after the engine has stopped, for example, it is necessary to operate an engine key or press a start button. According to this configuration, in order to restart the motor after the motor is stopped irrespective of the required rotational speed, the driver needs to input the cancel instruction information, and accordingly, the electric work vehicle restarts in response to an operation similar to that required to restart a work vehicle driven by an engine. Therefore, it is possible to make the behavior of the electric work vehicle closer to the behavior of a work vehicle that uses an engine as a motive power source.

It is preferable that, when the cancel instruction information is input, the controller is configured or programmed to cause a hydraulic continuously variable transmission included in the travel device to return to an initial state.

This configuration reduces the load applied to the hydraulic continuously variable transmission in the travel device, and accordingly, it becomes easy for the electric work vehicle to travel.

It is preferable that, when the restricted state is canceled, the controller is configured or programmed to keep the machine body from traveling.

According to this configuration, the controller is configured or programmed to make the transmission device neutral or returns the accelerator pedal to an initial position, for example, to keep the machine body from traveling, and therefore, it is possible to prevent a situation in which the machine body travels not in accordance with the intention of the driver.

It is preferable that the restricted state is canceled when the cancel instruction information is input and the machine body is in a state set in advance.

With this configuration, it is possible to prevent a situation in which the machine body travels not in accordance with the intention of the driver when the restricted state is canceled.

It is preferable that the electric work vehicle further includes a notifier to output a notification indicating that driving of the motor is stopped, when driving of the motor is stopped irrespective of the required rotational speed.

The operation sound generated by the motor is small not only when the motor is stopped but also when the motor is being driven, and therefore, it may be difficult for the driver to know whether the motor is stopped or driven, depending on the situation (for example, when a large sound is generated due to conditions of a road surface on which the electric work vehicle is traveling, or a large sound is generated from a work unit or due to the work being done). Therefore, by providing the notification from the notifier when driving of the motor is stopped irrespective of the required rotational speed, it is possible to ensure that the driver knows that the motor is stopped.

It is preferable that the electric work vehicle further includes a notifier to output a notification indicative of an increase in the load applied to the motor when the load applied to the motor has increased and the rotational speed of the motor has become a first rotational speed that is lower than the required rotational speed, and the controller is configured or programmed to stop driving the motor in at least one of: a case where a predetermined period of time has elapsed from when the notification is output by the notifier; and a case where the rotational speed of the motor has become a second rotational speed that is lower than the first rotational speed after the notification is output by the notifier.

According to this configuration, it is possible to notify the driver that the load applied to the motor has increased, in a period from when the rotational speed of the motor increases to when driving of the motor is stopped. Accordingly, it is possible to secure a time for the driver to take measures to reduce the load applied to the motor, before driving of the motor is stopped.

The above and other above elements, features, steps, characteristics and advantages of the present invention will become more apparent from the following detailed description of the example embodiments with reference to the attached drawings.

BRIEF DESCRIPTION OF THE DRAWINGS

FIG. 2 is a left side view showing arrangement of an inverter and the like.

FIG. 3 is a diagram showing a flow of motive power transmission.

FIG. 7 is a diagram showing an example of notification performed by a notifier.

DETAILED DESCRIPTION OF THE EXAMPLE EMBODIMENTS

Figure 1:
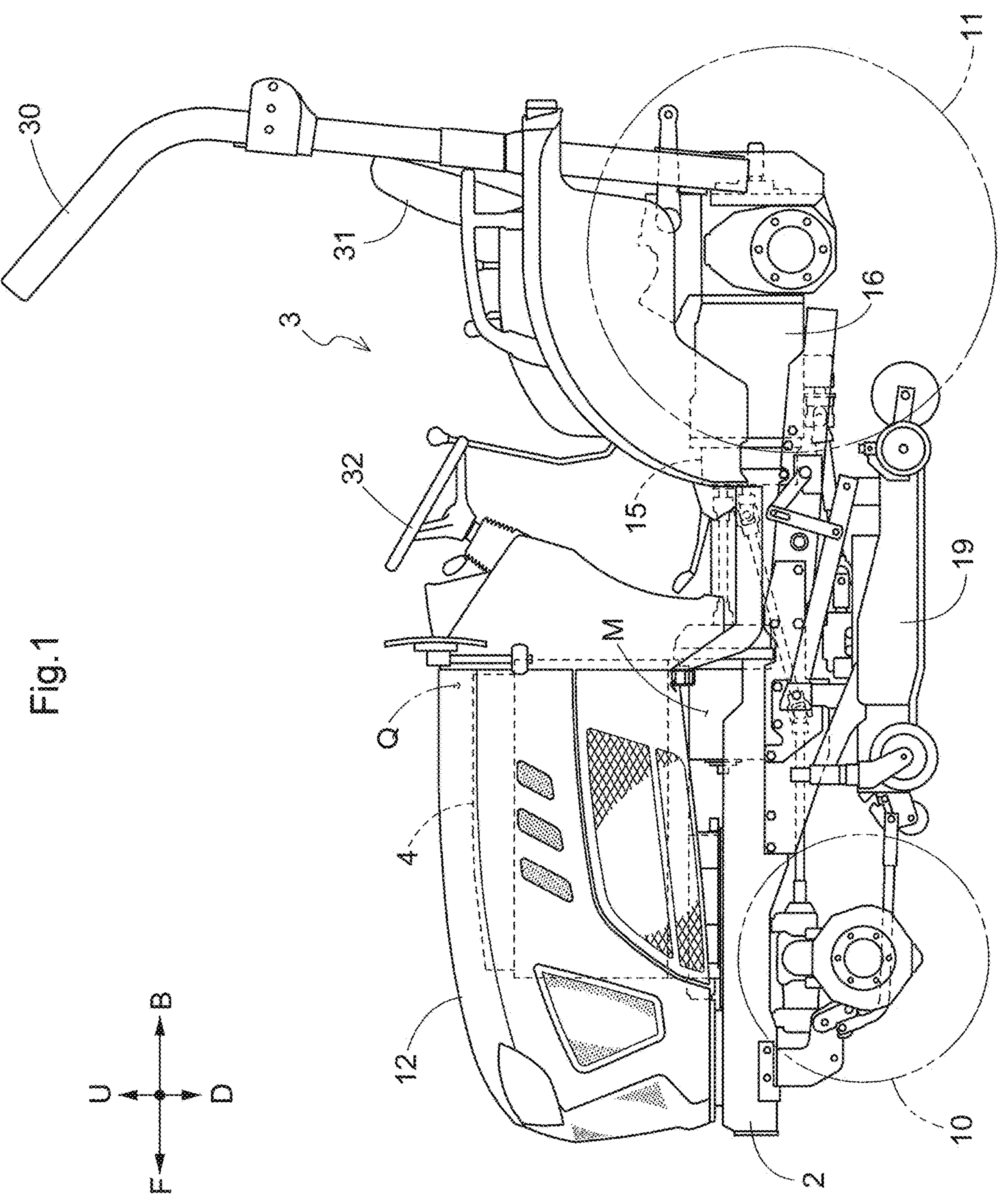
FIG. 1 is a left side view of a tractor.

Electric work vehicles according to example embodiments of the present invention are configured to behave similarly to a work vehicle that uses an engine as a motive power source, when a motor is rotating at a low speed. The following describes electric work vehicles according to example embodiments. Note that the following describes a case where the electric work vehicle is a tractor.

Example embodiments of the present invention will be described based on the drawings. In the following description, the direction of an arrow F and the direction of an arrow B in the drawings will be respectively referred to as "the front side" and "the rear side" unless otherwise stated. Also, the direction of an arrow U and the direction of an arrow D in the drawings will be respectively referred to as "the upper side" and "the lower side".

The following describes a tractor according to the present example embodiment. As shown in FIG. 1, the tractor includes left and right front wheels 10, left and right rear wheels 11, and a cover 12.

The tractor also includes a body frame 2 and a driving section 3. The body frame 2 is supported by the left and right front wheels 10 and the left and right rear wheels 11.

The cover 12 is disposed in a front portion of the body of the tractor. The driving section 3 is behind the cover 12. In other words, the cover 12 is in front of the driving section 3.

The driving section 3 includes a protective frame 30, a driver's seat 31, and a steering wheel 32. A driver can sit on the driver's seat 31. Accordingly, the driver can occupy the driving section 3. The driver steers the left and right front wheels 10 by operating the steering wheel 32. The driver can perform various driving operations in the driving section 3.

The tractor includes a battery 4. The cover 12 is pivotable about an opening/closing axis Q extending in the left-right direction of the body. Accordingly, the cover 12 is openable and closable. When the cover 12 is closed, the battery 4 is covered by the cover 12.

Figure 2:
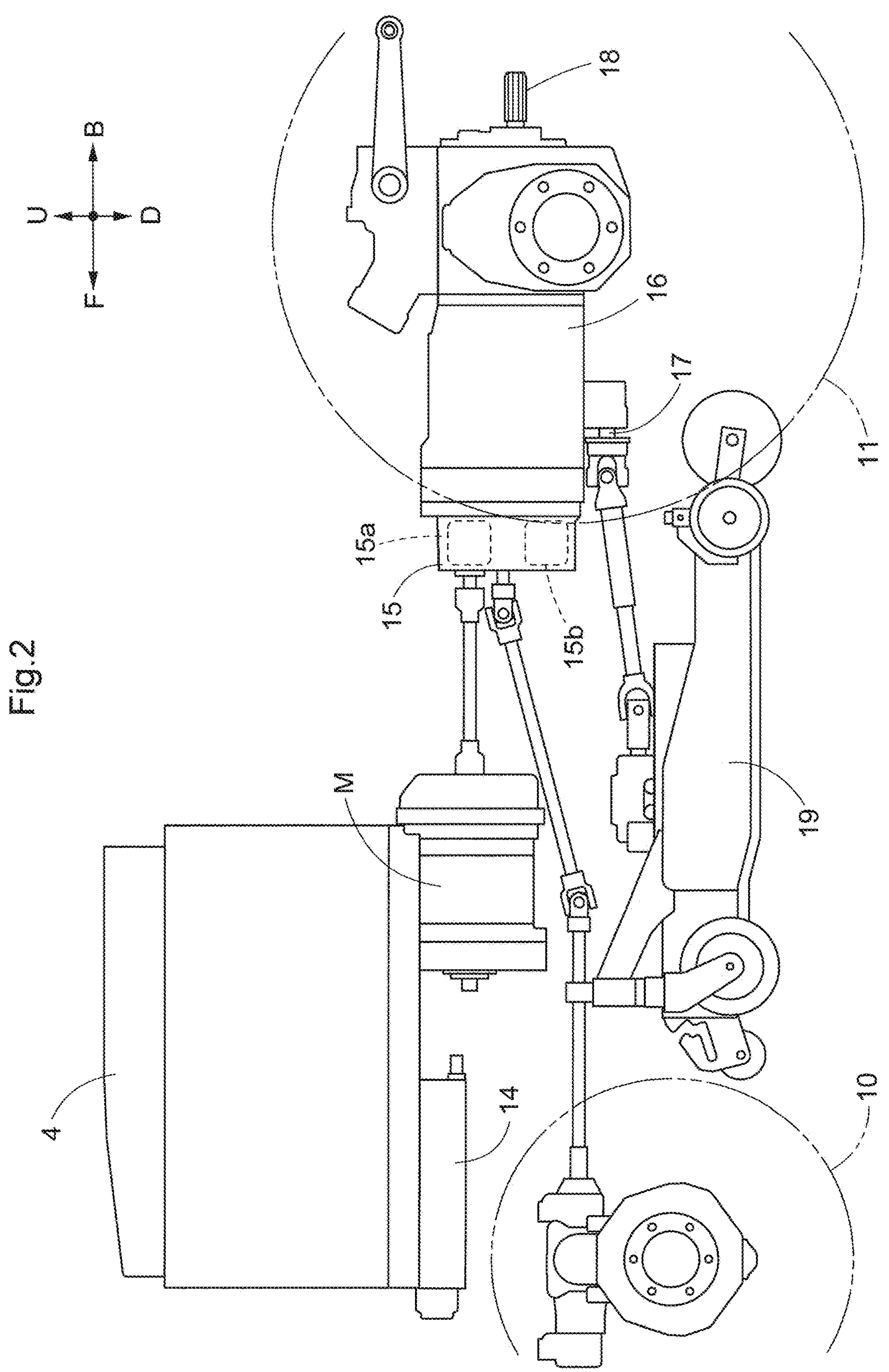

As shown in FIG. 2, the tractor includes an inverter 14 and a motor M. The battery 4 supplies power to the inverter 14. The inverter 14 converts DC power supplied from the battery 4 to AC power, and supplies the AC power to the motor M. The motor M is driven by the AC power supplied from the inverter 14.

Figure 3:
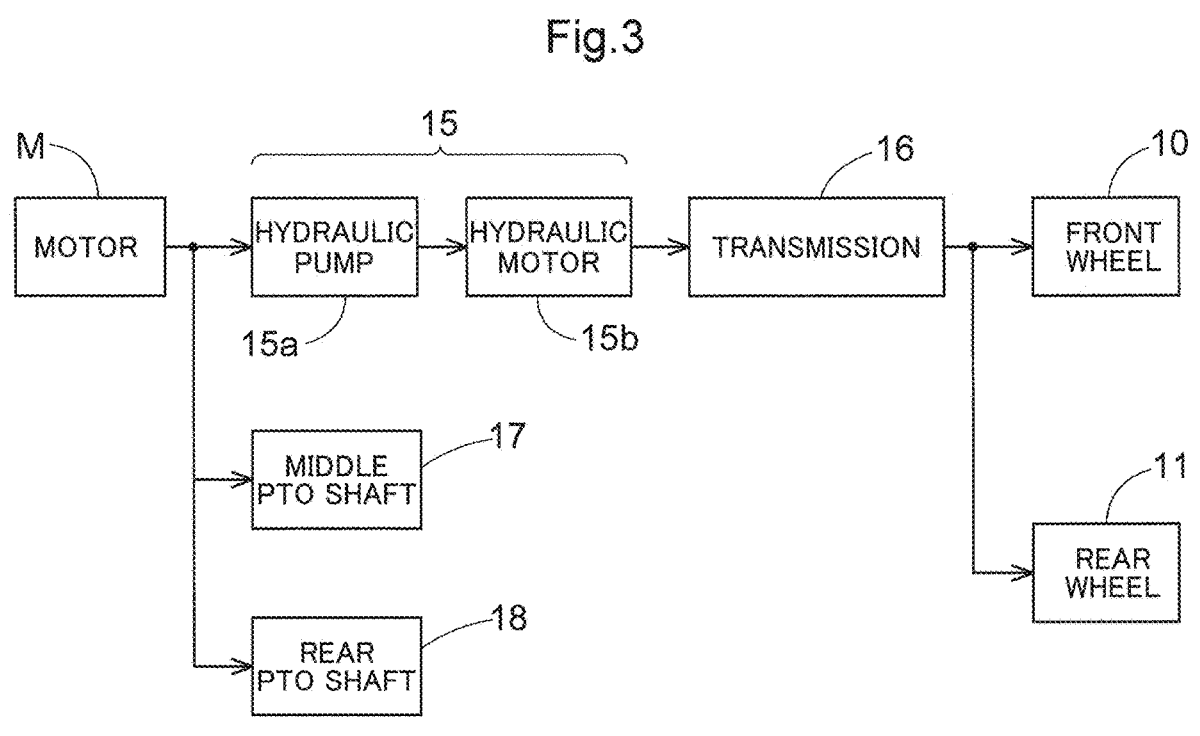

As shown in FIGS. 2 and 3, the tractor includes a hydraulic continuously variable transmission 15 and a transmission 16. As shown in FIG. 3, the hydraulic continuously variable transmission 15 includes a hydraulic pump 15*a* and a hydraulic motor 15*b*.

The hydraulic pump 15*a* is driven by rotational motive power transmitted from the motor M. As a result of the hydraulic pump 15*a* being driven, rotational motive power is output from the hydraulic motor 15*b*. The hydraulic continuously variable transmission 15 is configured to change the speed of rotational motive power between the hydraulic pump 15*a* and the hydraulic motor 15*b*. Also, the hydraulic continuously variable transmission 15 is configured to be capable of changing the transmission ratio in a stepless manner.

The rotational motive power output from the hydraulic motor 15*b* is transmitted to the transmission 16. The speed of the rotational motive power transmitted to the transmission 16 is changed by a gear transmission mechanism included in the transmission 16, and the rotational motive power is distributed to the left and right front wheels 10 and the left and right rear wheels 11. Thus, the left and right front wheels 10 and the left and right rear wheels 11 are driven.

As shown in FIGS. 2 and 3, the tractor also includes a middle PTO shaft 17 and a rear PTO shaft 18. Rotational motive power output from the motor M is distributed to the hydraulic pump 15*a*, the middle PTO shaft 17, and the rear PTO shaft 18. The middle PTO shaft 17 and the rear PTO shaft 18 are rotated by the distributed rotational motive power.

If a work device is connected to the middle PTO shaft 17 or the rear PTO shaft 18, the work device is driven by rotational motive power transmitted by the middle PTO shaft 17 or the rear PTO shaft 18. For example, in the present example embodiment, a grass cutting device 19 is connected to the middle PTO shaft 17 as shown in FIG. 2. The grass cutting device 19 is driven by rotational motive power transmitted by the middle PTO shaft 17.

Figure 4:
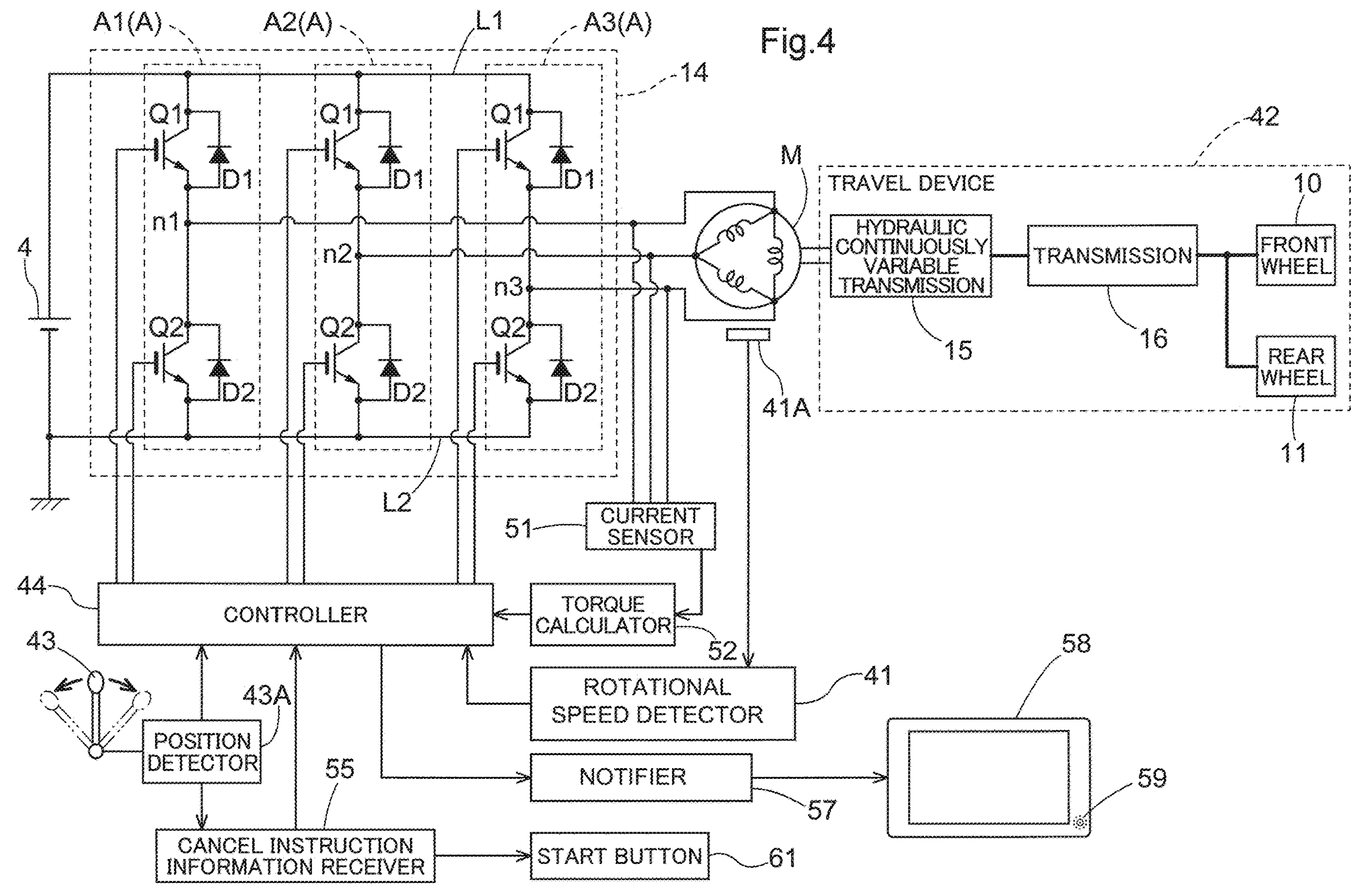
FIG. 4 is a diagram showing functional units for driving a motor.

FIG. 4 is a block diagram showing functional units relating to driving of the motor M. The block diagram of FIG. 4 shows the battery (battery for driving) 4, the inverter 14, the motor M, a rotational speed detector 41, a travel device 42, an operator 43, a controller 44, a current sensor 51, a torque calculator 52, and a notifier 57. In order to drive the motor M, each functional 1 unit is defined by hardware software, including a CPU as a core component.

The battery 4 covered by the cover 12 as described above is installed in the machine body. Electric energy stored in the battery 4 is used to drive the motor M.

The inverter 14 converts DC power that is output from the battery 4 to AC power. In the present example embodiment, the inverter 14 includes three arm portions A each including a first switching element Q1 and a second switching element Q2 connected in series between a first power supply line L1 and a second power supply line L2. The first power supply line L1 is connected to a positive terminal of the two output terminals of the battery 4, and the second power supply line L2 is connected to a negative terminal of the two output terminals of the battery 4. The inverter 14 includes the three arm portions A between the first power supply line L1 and the second power supply line L2. Hereinafter, the three arm portions A will be referred to as arm portions A1, A2, and A3 when distinguished from each other. In the present example embodiment, both the first switching element Q1 and the second switching element Q2 are defined by P-type IGBTs. A collector terminal of the first switching element Q1 is connected to the first power supply line L1, and an emitter terminal of the first switching element Q1 is connected to a collector terminal of the second switching element Q2. An emitter terminal of the second switching element Q2 is connected to the second power supply line L2. A diode D1 is provided between the emitter terminal and the collector terminal of the first switching element Q1, and an anode terminal and a cathode terminal of the diode D1 are respectively connected to the emitter terminal and the collector terminal of the first switching element Q1. Also, a diode D2 is provided between the emitter terminal and the collector terminal of the second switching element Q2, and an anode terminal and a cathode terminal of the diode D2 are respectively connected to the emitter terminal and the collector terminal of the second switching element Q2. Respective gate terminals of the first switching element Q1 and the second switching element Q2 are connected to the controller 44, which will be described later. The controller 44 is configured or programmed to perform PWM control to let current flow through the first switching element Q1 of an arm portion A of the inverter 14 and the second switching element Q2 of one of the other two arm portions A of the inverter 14. Accordingly, DC power output from the battery 4 is converted to AC power in accordance with the frequency of a PWM control signal.

The motor M is driven by the AC power converted by the inverter 14. Three terminals of the motor M are respectively connected to: a first node n1 to which the first switching element Q1 and the second switching element Q2 of the arm portion A1 are connected; a second node n2 to which the first switching element Q1 and the second switching element Q2 of the arm portion A2 are connected; and a third node n3 to which the first switching element Q1 and the second switching element Q2 of the arm portion A3 are connected. The first node n1 to which the first switching element Q1 and the second switching element Q2 of the arm portion A1 are connected is a portion at which the emitter terminal of the first switching element Q1 and the collector terminal of the second switching element Q2 of the arm portion A1 are connected. The second node n2 to which the first switching element Q1 and the second switching element Q2 of the arm portion A2 are connected is a portion at which the emitter terminal of the first switching element Q1 and the collector terminal of the second switching element Q2 constituting the arm portion A2 are connected. The third node n3 to which the first switching element Q1 and the second switching element Q2 of the arm portion A3 are connected is a portion at which the emitter terminal of the first switching element Q1 and the collector terminal of the second switching element Q2 constituting the arm portion A3 are connected. FIG. 4 shows a case where the coils of the motor M are connected in a delta configuration, but the coils of the motor M may also be connected in a star configuration.

The rotational speed detector 41 obtains rotational speed information indicative of a rotational speed of the motor M. The rotational speed of the motor M is a rotational speed of a rotor included in the motor M. The rotational speed can be detected with use of a rotation sensor 41A that includes a Hall element, for example. Alternatively, it is possible to calculate the rotational speed of the motor M based on the current flowing through the motor M, instead of using the rotation sensor 41A. In this case, the rotational speed can be calculated based on a detection result obtained from the current sensor 51, which will be described later. The detection result of the rotational speed of the motor M obtained from the rotation sensor 41A is transmitted as the rotational speed information to the rotational speed detector 41.

The travel device 42 is driven by the motor M. In the present example embodiment, the hydraulic continuously variable transmission 15, the transmission 16, the left and right front wheels 10, and the left and right rear wheels 11 described above are collectively referred to as the travel device 42. As described above, rotational motive power output from the motor M is transmitted via the hydraulic continuously variable transmission 15 to the transmission 16. The speed of the rotational motive power transmitted to the transmission 16 is changed by the gear transmission mechanism included in the transmission 16, and the rotational motive power is distributed to the left and right front wheels 10 and the left and right rear wheels 11. Thus, the left and right front wheels 10 and the left and right rear wheels 11 are driven as described above, and the tractor is movable forward.

Figure 5:
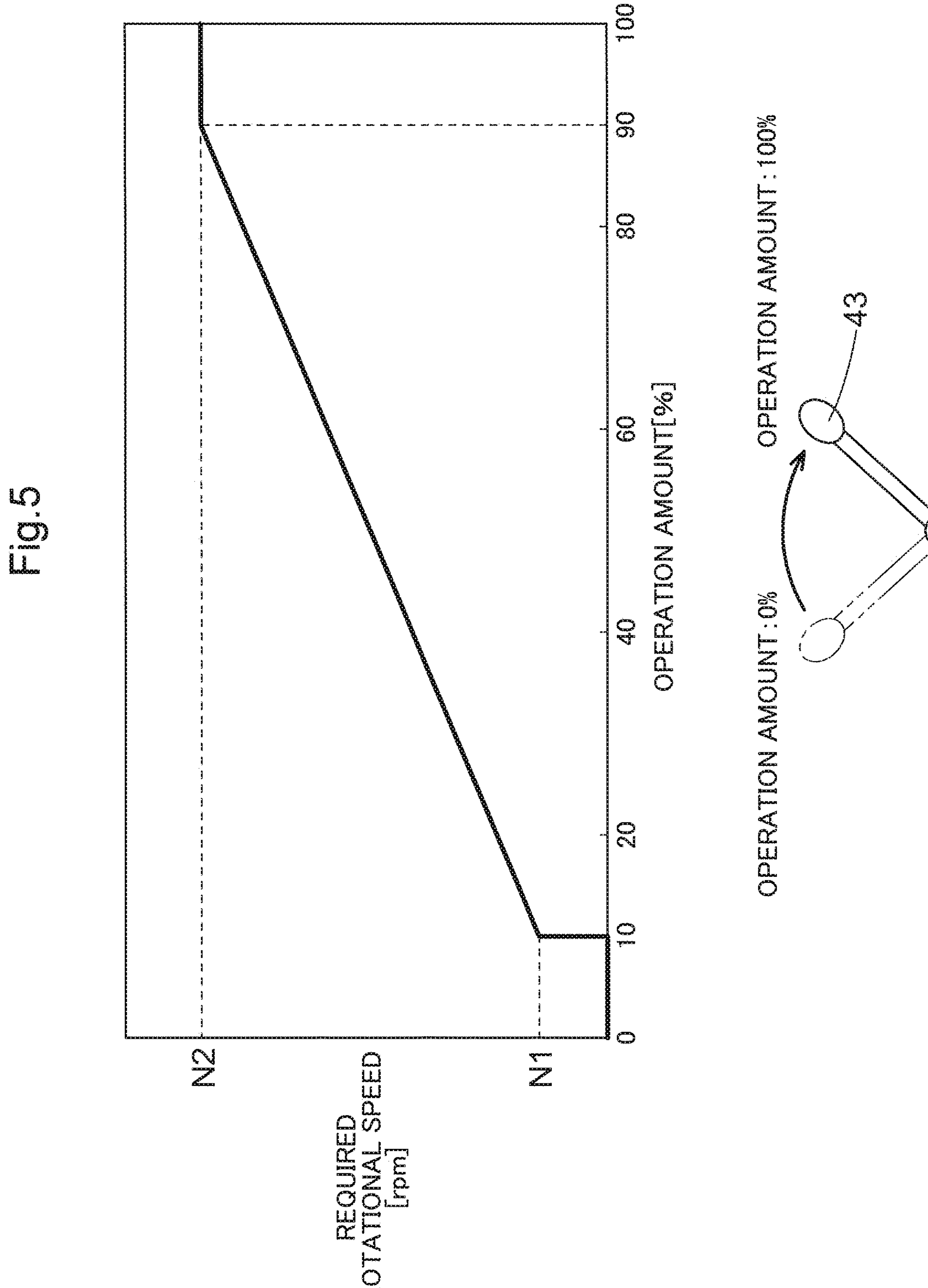
FIG. 5 is a diagram showing a relationship between an operation amount of an operator and a required rotational speed of the motor.

The operator 43 changes a required rotational speed required for the motor M. The required rotational speed required for the motor M is a command value indicative of a rotational speed of rotational motive power that the driver wants the motor M to output, i.e., a commanded rotational speed. In the present example embodiment, the operator 43 is a lever that is provided on a side of the driver's seat 31 and pivotable in the front-rear direction. As the operator 43 is inclined further forward, the required rotational speed increases and the motor M rotates at a higher speed, and the operator 43 is configured to be stably kept at a position to which the operator 43 is operated. FIG. 5 shows a relationship between an operation amount of the operator 43 and the required rotational speed of the motor M. In FIG. 5, the vertical axis indicates the required rotational speed of the motor M, and the horizontal axis indicates the operation amount of the operator 43. In the example shown in FIG. 5, when the operation amount is about 10%, for example, the required rotational speed is N1 (rpm), and when the operation amount is about 90%, for example, the required rotational speed is N2 (rpm). The required rotational speed is set to be proportional to the operation amount in the range from about 10% to about 90%, for example. The operation amount is expressed in the unit of %, and 0% corresponds to a state where the operator 43 is closest to the driver, and 100% corresponds to a state where the operator 43 is inclined forward as much as possible. In this example, the operator 43 is configured such that, when the operation amount is less than about 10%, the required rotational speed is 0 rpm, and when the operation amount is about 90% or more, for example, the required rotational speed is N2 rpm as described later in detail. In this example, the required rotational speed of the motor M can be set in accordance with the operation amount of the operator 43 based on the relationship described above. The state where the rotational speed is N1 (rpm) will be referred to as an "idling state", and the rotational speed N1 will be referred to as an "idling rotational speed".

Referring back to FIG. 4, in the present example embodiment, the operation amount of the operator 43, i.e., the position of the operator 43 in the front-rear direction is detected by a position detector 43A. Accordingly, it is possible to identify the required rotational speed required for the motor M based on the position of the operator 43 detected by the position detector 43A.

The controller 44 is configured or programmed to control the current flowing through the motor M by operating the inverter 14 in accordance with the rotational speed information and the required rotational speed. The rotational speed information is transmitted from the rotational speed detector 41 to the controller 44. The required rotational speed can be identified based on the detection result of the position of the operator 43, which is transmitted from the position detector 43A. The current flowing through the motor M is a current output from the inverter 14 and flowing through the coils of the motor M. Accordingly, the controller 44 is configured or programmed to control the current flowing through the coils of the motor M by controlling the inverter 14 in such a manner that the current rotational speed of the motor M indicated by the rotational speed information becomes equal to the required rotational speed identified based on the detection result obtained from the position detector 43A. This configuration makes it possible to control rotational motive power output from the motor M by operating the operator 43.

Here, the tractor is an electric tractor that travels by using rotational motive power output from the motor M, but there are also tractors that travel by using rotational motive power output from an engine. A torque (output torque) capable of outputting for an engine in a tractor is determined in accordance with the rotational speed of the engine. The engine stops (so-called "engine stall") if a torque that is considerably higher than the torque that the engine can output at the rotational speed acts on the engine. On the other hand, a torque that the motor M can output is also determined in accordance with the rotational speed of the motor M, but even if a torque that is considerably higher than the torque that the motor M can output acts on the motor M, the rotational speed of the motor M gradually decreases to zero, and the motor M rarely stops suddenly as in the case of the engine. Therefore, for example, a driver who has switched from a tractor that uses an engine as the motive power source to the electric tractor may feel that something is wrong. Therefore, the tractor according to the present example embodiment is configured to keep such a driver from feeling that something is wrong as described above.

Specifically, when the load applied to the motor M is higher than a load set in advance, the controller 44 is configured or programmed to stop driving the motor M irrespective of the required rotational speed. The load applied to the motor M is the torque acting on the motor M. The load set in advance is a suitable load at which driving of the motor M should be stopped. For example, the load can be set based on a load acting on an engine when the engine stalls. "Irrespective of the required rotational speed" means that the rotational speed of the motor M is not controlled so as to match the required rotational speed specified by the operator 43. "Stops driving the motor M" means shutting off the current flowing from the inverter 14 to the coils of the motor M. Accordingly, when the torque acting on the motor M becomes higher than the predetermined load at which driving of the motor M should be stopped, the controller 44 is configured or programmed to stop the motor M by shutting off the current flowing from the inverter 14 to the coils of the motor M without making the rotational speed of the motor M match the required rotational speed specified by the operator 43.

Specifically, the controller can be set so as to stop driving of the motor M if the required rotational speed is about 2000 rpm and the actual rotational speed of the motor M is about 1500 rpm due to a high load being applied to the motor M, for example. In order to make the driver have a feeling closer to the feeling that the driver has when driving a tractor that uses an engine as the motive power source, the controller may also be configured or programmed so as to stop driving of the motor M if the required rotational speed is higher than or equal to the idling rotational speed and the actual rotational speed of the motor M is equal to or lower than the idling rotational speed due to a high load being applied to the motor M.

The torque of the motor M can be calculated based on the current flowing through the motor M. The current value of the current flowing through the motor M is detected by the current sensor 51. The current flowing through the motor M is equal or substantially equal to a current flowing through a cable connecting the first node n1 and the motor M, a cable connecting the second node n2 and the motor M, or a cable connecting the third node n3 and the motor M, and therefore, the current sensor 51 may detect the current value of the current flowing through the motor M based on the current flowing through any of these cables. Also, the current sensor 51 may detect the current with use of a Hall element without interrupting these cables, or detect the current based on a voltage drop at resistors disposed between these cables and a reference potential (e.g., ground potential). The detection result of the current value obtained by the current sensor 51 is transmitted to the torque calculator 52. Note that the detection result of the current value may be transmitted to the controller 44, and the controller 44 may perform PWM control of the inverter 14 taking the current flowing through the motor M into account.

The torque calculator 52 calculates the torque output from the motor M based on the current value. There is a predetermined relationship between the current value of the current flowing through the motor M and the torque output from the motor M. Preferably, a map showing the relationship is stored in the torque calculator 52 in advance, and an output torque corresponding to the current value of the current flowing through the motor M is calculated based on the map.

In this case, it is preferable that the controller 44 is configured or programmed to stop driving the motor M when the torque output from the motor M is larger than a torque value set in advance. The torque output from the motor M is the torque calculated by the torque calculator 52. It is preferable that the controller 44 is configured or programmed to compare the torque with the torque value set in advance, and if the torque is larger than the torque value, determines that the load applied to the motor M is higher than the load set in advance, and stops driving the motor M.

Also, it is preferable that the controller 44 is configured or programmed to stop driving the motor M irrespective of the required rotational speed when the rotational speed of the motor M is not higher than a rotational speed set in advance. The rotational speed of the motor M is obtained by the rotational speed detector 41. The rotational speed set in advance may be several hundreds revolutions per minute, for example. Alternatively, the rotational speed set in advance may also be a rotational speed that is lower than a target rotational speed by about 30% or is lower than the target rotational speed by several hundreds revolutions per minute, for example. Accordingly, it is preferable that the controller 44 is configured or programmed to stop driving the motor M when the rotational speed of the motor M obtained by the rotational speed detector 41 is the rotational speed set in advance, which is several hundreds revolutions per minute (rpm), or lower than the target rotational speed by about 30%, or lower than the target rotational speed by several hundreds revolutions per minute, for example.

At this time, rather than immediately stopping driving of the motor M, it is also possible to stop driving of the motor M after the state where the rotational speed of the motor M is not higher than the rotational speed set in advance has continued for a certain period of time, such as a few seconds.

A configuration is also possible in which, if the load applied to the motor M has increased due to the travel device 42, the hydraulic pressure of the hydraulic continuously variable transmission 15 is reduced by operating a relief valve, and if the state where a high load is applied to the motor M continues even after the hydraulic pressure is reduced, driving of the motor M is stopped. The load may be increased due to the travel device 42 when the tractor is stuck in mud, for example.

With this configuration, it is possible to simulate an engine stall of a tractor including an engine, for example. Therefore, for example, a driver who has switched from a tractor including an engine is capable of using the tractor including the motor M without feeling that something is wrong.

In the present example embodiment, when driving of the motor M is stopped irrespective of the required rotational speed as described above, the controller 44 enters a restricted state in which operating of the inverter 14 is restricted. The case where driving of the motor M is stopped irrespective of the required rotational speed is a case where driving of the motor M is stopped due to the load applied to the motor M becoming higher than the load set in advance, such as a case where driving of the motor M is stopped when the torque output from the motor M is higher than the torque value set in advance or when the rotational speed of the motor M is not higher than the rotational speed set in advance. "Operating of the inverter 14 is restricted" means that electricity cannot be supplied to the inverter 14. This state will be referred to as the "restricted state". Accordingly, when driving of the motor M is stopped due to the load applied to the motor M becoming higher than the load set in advance, the controller 44 enters the state where electricity cannot be supplied to the inverter 14.

In the present example embodiment, the restricted state can be canceled in response to cancel instruction information being input by the driver. The cancel instruction information indicates an instruction to cancel the restricted state of the controller 44, and the driver can give the instruction by pressing a start button 61 provided in a front panel of the driving section 3 or operating the operator 43 to make the required rotational speed zero, for example. The instruction may be received by a cancel instruction information receiver 55 in response to the start button 61 being pressed. Alternatively, the position of the operator 43 may be detected by the position detector 43A in response to the operator 43 being operated to make the required rotational speed zero, and the cancel instruction information receiver 55 may receive the detection result from the position detector 43A.

Upon receiving the cancel instruction, the cancel instruction information receiver 55 preferably transmits information indicating that the cancel instruction has been received, to the controller 44. Thus, the restricted state of the controller 44 can be canceled.

Figure 6:
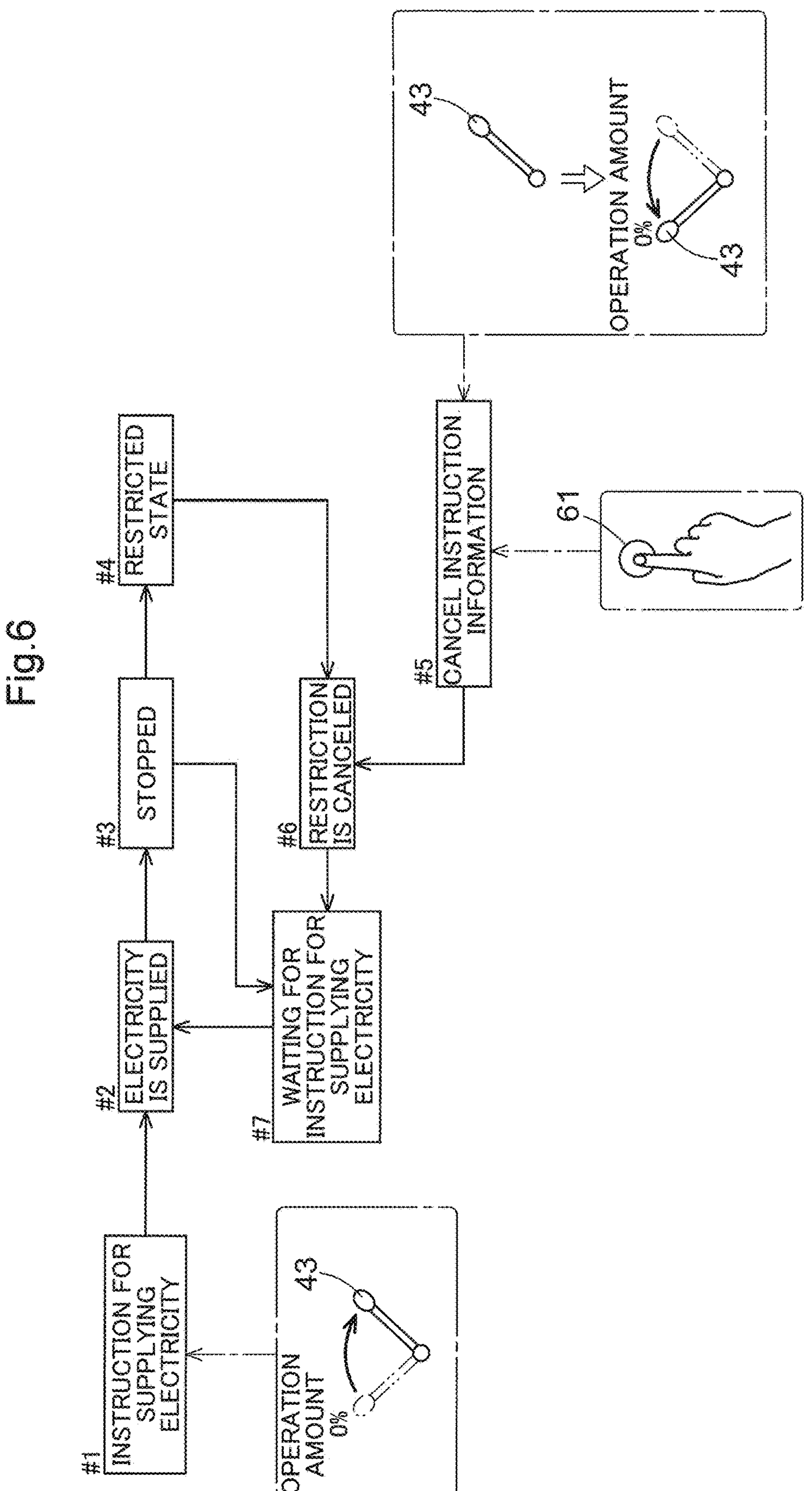
FIG. 6 is a state transition diagram showing control states of the motor.

FIG. 6 shows a state transition diagram showing control states of the motor M. The driver operates the operator 43 to drive the motor M. The position of the operator 43 at this time is detected by the position detector 43A and transmitted as a required rotational speed to the controller 44. Upon receiving the required rotational speed, the controller 44 is configured or programmed to determine that an instruction to supply electricity to the inverter 14 is received and supplies electricity to the inverter 14 (#1). As a result, electricity is supplied to the motor M via the inverter 14 (#2). If the load applied to the motor M becomes higher than the load set in advance while electricity is supplied to the motor M, the controller 44 is configured or programmed to stop supplying electricity to the inverter 14. As a result, the motor M stops (#3). The controller 44 enters the restricted state because the motor M is stopped due to a cause other than the required rotational speed specified by the operator 43 being 0 [rpm] (#4).

If the start button 61 is pressed by the driver or the operator 43 is returned to a position where the operation amount is 0% while the controller 44 is in the restricted state, the cancel instruction information receiver 55 detects these operations and transmits cancel instruction information to the controller 44 (#5). In response to the cancel instruction information being transmitted, the restricted state is canceled and the controller 44 enters a canceled state (#6). After the restricted state is canceled, the controller 44 is configured or programmed to wait for an instruction to supply electricity (#7). If the driver operates the operator 43 to input a required rotational speed of the motor M while the controller 44 is waiting for an instruction to supply electricity, the controller 44 is configured or programmed to supply electricity to the inverter 14 in accordance with the required rotational speed, and electricity is supplied to the motor M (#2). In the present example embodiment, the control states of the motor M transition based on the state transition diagram described above.

Note that, if the current flowing through the motor M is shut off (#3) in response to the operator 43 being operated by the driver while electricity is supplied to the motor M in the state #2, the controller 44 does not enter the restricted state, but enters the state #7 and waits for an instruction to supply electricity.

A configuration is also possible in which the hydraulic continuously variable transmission 15 in the travel device 42 is caused to return to an initial state when receiving the cancel instruction in the state #5. For example, the hydraulic continuously variable transmission 15 is made neutral to return to the initial state. The hydraulic continuously variable transmission 15 may return to the initial state in response to a switch or the like being operated by the driver, or the relief valve in the hydraulic continuously variable transmission 15 may be automatically operated to reduce the pressure and make the hydraulic continuously variable transmission 15 neutral.

It is also possible to perform other processing to prevent the tractor from traveling when the restricted state is canceled. For example, if the transmission 16 includes an auxiliary transmission, the auxiliary transmission may be made neutral or the accelerator pedal may be returned to an initial state when receiving the cancel instruction in the state #5. It is also possible to perform processing to prevent rotation of the PTO shafts when receiving the cancel instruction in the state #5. For example, it is possible to stop rotation of the middle PTO shaft 17 and the rear PTO shaft 18 by disengaging clutches, for example, to prevent loads from being applied to the PTO shafts when the restricted state is canceled.

Figure 7:
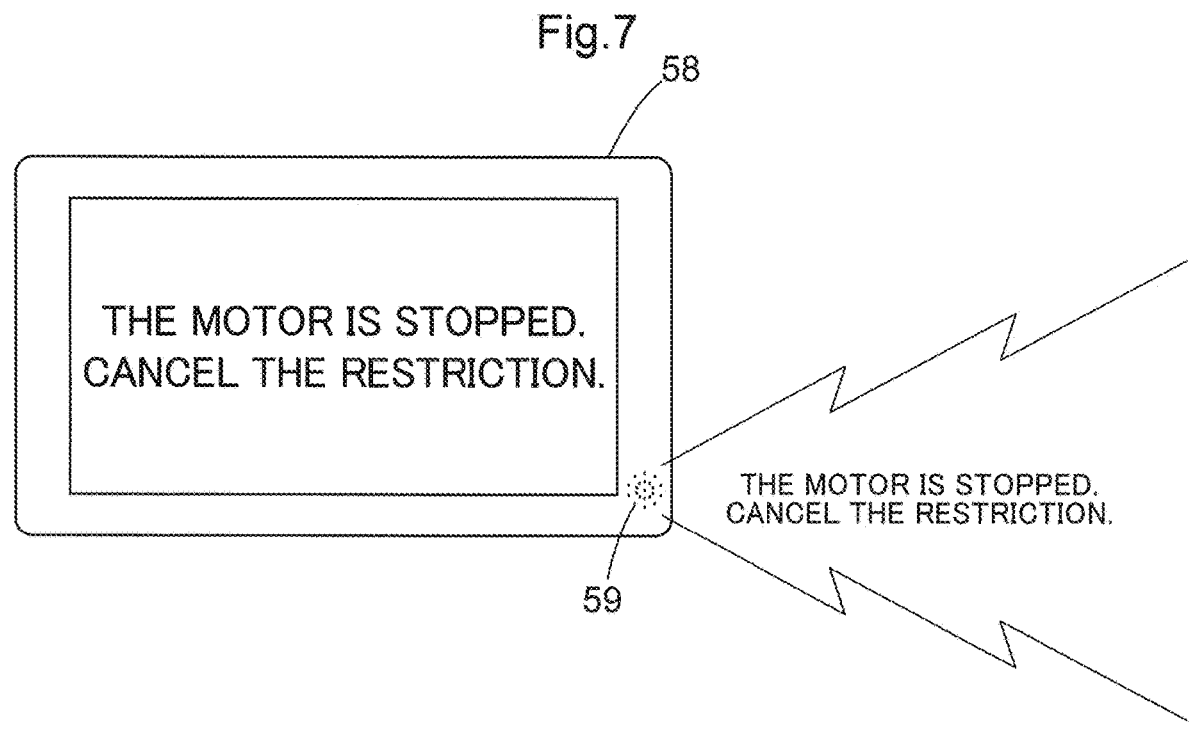

Here, when driving of the motor M is stopped irrespective of the required rotational speed as described above, it is preferable that the notifier 57 outputs a notification indicating that driving of the motor M is stopped, so that the driver can know whether or not driving of the motor M is stopped due to the load applied to the motor M becoming higher than the load set in advance. That is to say, when driving of the motor M is stopped irrespective of the required rotational speed, it is preferable to display a message such as "The motor is stopped. Cancel the restriction." on a display screen of a display device 58 provided in the driving section 3 of the tractor or output audio saying "The motor is stopped. Cancel the restriction." from a speaker 59 as shown in FIG. 7. This enables the driver to know whether or not driving of the motor M is stopped due to the load applied to the motor M becoming higher than the load set in advance.

A configuration is also possible in which, when receiving the cancel instruction in the state #5, the restricted state cannot be canceled unless processing to prevent the tractor from traveling or preventing rotation of the PTO shafts is performed in advance. For example, processing for automatically making the hydraulic continuously variable transmission 15 neutral is added after the restricted state #4 to prevent the tractor from traveling, or processing to make the hydraulic continuously variable transmission 15 neutral is performed manually.

OTHER EXAMPLE EMBODIMENTS

The electric work vehicles are tractors in the above-described example embodiments, but the electric work vehicles may also be a work vehicle other than a tractor, such as a rice transplanter, a combine, a construction machine, or a lawn mower.

The motor M is a three-phase motor and the inverter 14 includes three arm portions A in the above-described example embodiments, but the motor M does not necessarily need to be a three-phase motor, and the number of arm portions A of the inverter 14 can be set in accordance with the number of phases of the motor M.

In the above example embodiments, the electric work vehicles include the current sensor 51 and the torque calculator 52, and the controller 44 is configured or programmed to control driving of the motor M in accordance with a torque calculated by the torque calculator 52 based on a current value detected by the current sensor 51. However, a configuration is also possible in which the electric work vehicle does not include the current sensor 51 and the torque calculator 52. In this case, driving of the motor M may be controlled by the controller 44 in accordance with the load applied to the motor M as described in the above example embodiment.

In the above example embodiment, when driving of the motor M is stopped irrespective of the required rotational speed, the controller 44 enters the restricted state where operating of the inverter 14 is restricted, and the restricted state is canceled in response to cancel instruction information being input by the driver. However, a configuration is also possible in which the controller 44 does not enter the restricted state when driving of the motor M is stopped irrespective of the required rotational speed. Also, instead of canceling the restricted state in response to cancel instruction information being input by the driver, it is also possible to adopt a configuration in which the restricted state continues for a period of time set in advance after driving of the motor M is stopped irrespective of the required rotational speed, and is automatically canceled when the period of time has elapsed, for example.

In the above example embodiment, when driving of the motor M is stopped irrespective of the required rotational speed, the notifier 57 outputs a notification indicating that driving of the motor M is stopped. However, the notification indicating that driving of the motor M is stopped does not necessarily need to be output when driving of the motor M is stopped irrespective of the required rotational speed. Also, the notifier 57 is configured to output the notification by performing a predetermined display on the display screen of the display device 58 or outputting audio from the speaker 59, but the notifier 57 may also be configured to perform a display on a display screen of a portable terminal of the operator or output audio from a speaker of the portable terminal. Alternatively, the notifier 57 may be configured to output the notification indicating that driving of the motor M is stopped, with use of a buzzer or a lamp provided on the body of the tractor.

In the above example embodiments, after driving of the motor M is stopped, the notifier 57 outputs the notification indicating that driving of the motor M is stopped. However, when the rotational speed of the motor M has become lower than the required rotational speed by a certain amount, it is preferable that the notifier 57 displays a message such as "An excessive load is applied to the motor. Reduce the load." or outputs audio saying "An excessive load is applied to the motor. Reduce the load." from the speaker 59. It is also possible to use a buzzer or a lamp to output such a notification. In this case, it is possible to output the notification when the required rotational speed is about 2000 rpm and the actual rotational speed of the motor M is about 1500 rpm due to an increase in the load applied to the motor M, and stop driving of the motor M when a certain period of time has elapsed after the notification is output or the actual rotational speed has decreased to about 1000 rpm, for example.

Example embodiments of the present invention are applicable to electric work vehicles that travel by using electric energy.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric work vehicle comprising:
a battery in a machine body;
an inverter to convert DC power that is output from the battery to AC power;
a motor drivable by the AC power converted by the inverter;
a rotational speed detector to obtain rotational speed information indicative of a rotational speed of the motor;
a travel device drivable by the motor;
an operator to change a required rotational speed required for the motor;
a controller configured or programmed to control a current flowing through the motor by operating the inverter in accordance with the rotational speed information and the required rotational speed;
a current sensor to detect a current value of the current flowing through the motor; and
a torque calculator to calculate a torque that is output from the motor based on the current value; wherein
when the torque output from the motor is larger than a torque value set in advance, the controller is configured or programmed to stop driving the motor irrespective of the required rotational speed; and
when for a predetermined period of time, the rotational speed of the motor has been not higher than a rotational speed set in advance, the controller is configured or programmed to stop driving the motor irrespective of the required rotational speed.

2. An electric work vehicle comprising:
a battery in a machine body;
an inverter to convert DC power that is output from the battery to AC power;
a motor drivable by the AC power converted by the inverter;
a rotational speed detector to obtain rotational speed information indicative of a rotational speed of the motor;
a travel device drivable by the motor;
an operator to change a required rotational speed required for the motor; and
a controller configured or programmed to control a current flowing through the motor by operating the inverter in accordance with the rotational speed information and the required rotational speed; wherein
when the rotational speed of the motor has become equal to or lower than an idling rotational speed that is lower than the required rotational speed due to an increase in a load applied to the motor, the controller is configured or programmed to stop driving the motor irrespective of the required rotational speed.

3. An electric work vehicle comprising:
a battery in a machine body;
an inverter to convert DC power that is output from the battery to AC power;
a motor drivable by the AC power converted by the inverter;
a rotational speed detector to obtain rotational speed information indicative of a rotational speed of the motor;
a travel device drivable by the motor;
an operator to change a required rotational speed required for the motor; and
a controller configured or programmed to control a current flowing through the motor by operating the inverter in accordance with the rotational speed information and the required rotational speed; wherein
when a load applied to the motor has become higher than a load set in advance due to the travel device, the controller is configured or programmed to reduce a hydraulic pressure of a hydraulic continuously variable transmission included in the travel device by driving a relief valve, and when a high load is still applied to the motor after the relief valve is driven, the controller is configured or programmed to stop driving the motor irrespective of the required rotational speed.

4. An electric work vehicle comprising:

a battery in a machine body;

an inverter to convert DC power that is output from the battery to AC power;

a motor drivable by the AC power converted by the inverter;

a rotational speed detector to obtain rotational speed information indicative of a rotational speed of the motor;

a travel device drivable by the motor;

an operator to change a required rotational speed required for the motor; and a controller configured or programmed to control a current flowing through the motor by operating the inverter in accordance with the rotational speed information and the required rotational speed; wherein when a load applied to the motor is higher than a load set in advance, the controller is configured or programmed to stop driving the motor irrespective of the required rotational speed;

when driving of the motor is stopped irrespective of the required rotational speed, the controller is configured or programmed to enter a restricted state where operating of the inverter is restricted; and the restricted state is canceled in response to cancel instruction information being input.

5. The electric work vehicle according to claim 4, wherein, when the cancel instruction information is input, the controller is configured or programmed to cause a hydraulic continuously variable transmission included in the travel device to return to an initial state.

6. The electric work vehicle according to claim 4, wherein, when the restricted state is canceled, the controller is configured or programmed to keep the machine body from traveling.

7. The electric work vehicle according to claim 4, wherein the restricted state is canceled when the cancel instruction information is input and the machine body is in a state set in advance.

8. The electric work vehicle according to claim 1, further comprising:

a notifier to output a notification indicating that driving of the motor is stopped, when driving of the motor is stopped irrespective of the required rotational speed.

9. An electric work vehicle comprising:

a battery in a machine body;

an inverter to convert DC power that is output from the battery to AC power;

a motor drivable by the AC power converted by the inverter;

a rotational speed detector to obtain rotational speed information indicative of a rotational speed of the motor;

a travel device drivable by the motor;

an operator to change a required rotational speed required for the motor;

a controller configured or programmed to control a current flowing through the motor by operating the inverter in accordance with the rotational speed information and the required rotational speed; and a notifier to output a notification indicative of an increase in the load applied to the motor when the load applied to the motor has increased and the rotational speed of the motor has become a first rotational speed that is lower than the required rotational speed; wherein when a load applied to the motor is higher than a load set in advance, the controller is configured or programmed to stop driving the motor irrespective of the required rotational speed in at least one of:

a case where a predetermined period of time has elapsed from when the notification is output by the notifier; and a case where the rotational speed of the motor has become a second rotational speed that is lower than the first rotational speed after the notification is output by the notifier.

* * * * *